(12) United States Patent
Barwicz et al.

(10) Patent No.: US 10,775,568 B2
(45) Date of Patent: *Sep. 15, 2020

(54) SINGLE-MODE POLYMER WAVEGUIDE CONNECTOR ASSEMBLY DEVICE

(71) Applicant: INTERNATIONAL BUSINESS MACHINES CORPORATION, Armonk, NY (US)

(72) Inventors: Tymon Barwicz, Yorktown Heights, NY (US); Hidetoshi Numata, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,718

(22) Filed: Nov. 13, 2019

(65) Prior Publication Data

US 2020/0081196 A1 Mar. 12, 2020

Related U.S. Application Data

(60) Continuation of application No. 16/285,750, filed on Feb. 26, 2019, now Pat. No. 10,534,140, which is a
(Continued)

(51) Int. Cl.
*G02B 6/30* (2006.01)
*G02B 6/38* (2006.01)
*G02B 6/122* (2006.01)

(52) U.S. Cl.
CPC ......... *G02B 6/3849* (2013.01); *G02B 6/1221* (2013.01); *G02B 6/30* (2013.01);
(Continued)

(58) Field of Classification Search
None
See application file for complete search history.

(56) References Cited

U.S. PATENT DOCUMENTS

| | | | |
|---|---|---|---|
| 5,625,730 A | 4/1997 | Ishikawa et al. | |
| 6,227,722 B1 | 5/2001 | Kropp | |

(Continued)

FOREIGN PATENT DOCUMENTS

| | | |
|---|---|---|
| GB | 1517965 A | 7/1978 |
| JP | 2005128407 A | 5/2005 |

(Continued)

OTHER PUBLICATIONS

List of IBM Patents or Patent Applications Treated as Related dated Feb. 26, 2019, 2 pages.
(Continued)

*Primary Examiner* — Chad H Smith
(74) *Attorney, Agent, or Firm* — Tutunjian & Bitetto, P.C.; Vazken Alexanian

(57) ABSTRACT

A method for assembling a waveguide connector includes positioning a polymer waveguide in one or more insertion structures within an inner portion of a cap where the polymer waveguide has alignment features. The method also includes inserting a ferrule into the inner portion of the cap such that an inner wall of the cap seals around the assembled connector and heating the polymer waveguide and the ferrule to a first temperature with the ferrule comprising alignment features and having a different coefficient of thermal expansion from the polymer waveguide. The alignment features of the polymer waveguide align with the alignment features of the ferrule when the polymer waveguide and the ferrule are heated to the first temperature.

20 Claims, 6 Drawing Sheets

Related U.S. Application Data division of application No. 15/233,183, filed on Aug. 10, 2016, now Pat. No. 10,281,658.

(52) U.S. Cl.
CPC ......... *G02B 6/3843* (2013.01); *G02B 6/3863* (2013.01); *G02B 6/3882* (2013.01); *G02B 6/3885* (2013.01)

(56) References Cited

U.S. PATENT DOCUMENTS

| | | |
|---|---|---|
| 7,133,592 B2 | 11/2006 | Yasuda et al. |
| 7,150,567 B1 | 12/2006 | Luther et al. |
| 7,295,743 B2 | 11/2007 | Yatsuda et al. |
| 7,413,688 B2 | 8/2008 | Noddings et al. |
| 7,447,405 B1 | 11/2008 | Yamada et al. |
| 7,822,308 B2 | 10/2010 | Hodono et al. |
| 8,529,138 B2 | 9/2013 | Duis et al. |
| 8,750,658 B2 | 6/2014 | Lee |
| 8,764,310 B2 | 7/2014 | Duis et al. |
| 10,534,140 B2 * | 1/2020 | Barwicz ............... G02B 6/1221 |
| 2002/0114578 A1 | 8/2002 | Lin et al. |
| 2003/0219212 A1 | 11/2003 | Kwon et al. |
| 2004/0022499 A1 | 2/2004 | Shimizu et al. |
| 2005/0031291 A1 | 2/2005 | Gao et al. |
| 2006/0188196 A1 | 8/2006 | Charters et al. |
| 2006/0274995 A1 | 12/2006 | Lee et al. |
| 2007/0047888 A1 | 3/2007 | Liu |
| 2011/0013866 A1 | 1/2011 | Rosenberg et al. |
| 2012/0014649 A1 | 1/2012 | Duis et al. |
| 2012/0205825 A1 | 8/2012 | Nagafuji et al. |
| 2012/0315478 A1 | 12/2012 | Naritomi et al. |
| 2013/0136399 A1 | 5/2013 | Jubin et al. |
| 2013/0156365 A1 | 6/2013 | Barwicz et al. |
| 2013/0266268 A1 | 10/2013 | Li et al. |
| 2014/0061979 A1 | 3/2014 | Numata et al. |
| 2014/0270661 A1 | 9/2014 | Brown |
| 2014/0321809 A1 | 10/2014 | Bowen et al. |
| 2016/0111612 A1 | 4/2016 | Yen et al. |

FOREIGN PATENT DOCUMENTS

| | | |
|---|---|---|
| JP | 5485116 | 6/2012 |
| WO | 02086552 A2 | 10/2002 |

OTHER PUBLICATIONS

List of IBM Patents or Patent Applications dated Aug. 10, 2016 Treated as Related.
List of IBM Patents or Patent Applications Treated as Related dated Nov. 13, 2019, 2 pages.

* cited by examiner

SINGLE-MODE POLYMER WAVEGUIDE CONNECTOR ASSEMBLY DEVICE

BACKGROUND

Technical Field

The present invention relates to optical waveguides and, more particularly, to a single-mode polymer waveguide connector assembly device.

Description of the Related Art

Waveguides are used to transport, e.g., optical signals over large distances with very low losses. Waveguides employ, e.g., a difference between a refractive index for an internal medium called "core" and an external medium called "clad". In the example of fiber optics, the transport medium "core" is made of a higher refractive index glass and the external medium "clad" is made of a lower refractive index glass. These two glass layers are surrounded by sheath, shielding, or air. When an optical signal in the inner core layer hits the boundary between core and clad, it is internally reflected instead of escaping from core layer. As a result, optical fibers can be used to transport very low-loss signals across long distances.

Optical fibers used for waveguides are thin, flexible, and frequently made of silica glass, but may also be made from, e.g., fluoride glass, phosphate glass, chalcogenide glass, or crystal materials such as sapphire. Appropriate materials are selected in accordance with desired refractive properties. Some fibers support many transverse transmission modes and are called multi-mode fibers, whereas others support a single mode and are called single-mode fibers. Single-mode fibers are frequently used for long-distance links, as multi-mode fibers are susceptible to modal dispersion over long distances due to slightly different transmission speeds between the different modes.

Polymer materials exhibit favorable properties for use in optical waveguides, which may be used for high-density optical interconnects in fiber-optic communications, optronics, and other light-based technologies. Waveguide connectors are used to connect between separate polymer waveguides and between polymer waveguides and glass fibers.

However, existing polymer waveguide connectors are difficult to install under precise positioning requirements. One such connector is the polymer mechanical transfer (PMT) connector which is used as a multimode polymer waveguide connector. These connectors are difficult to assemble with positioning errors of under a few micrometers and are simply not feasible for positioning errors of less than a micrometer. Positioning errors can lead to loss of signal from, e.g., reflections that occur at imperfect junctions.

In addition, contamination on the polymer waveguide connector effectively decreases adiabatic coupling between the polymer waveguide connector and a separate silicon waveguide, such as an optical circuit on a silicon (Si) chip. During Silicon photonic packaging, no overclad on the polymer waveguide connector is employed, and the polymer waveguide connector core and the silicon waveguide core are directly in contact with each for high efficient adiabatic coupling. Polyimide cover films and/or adhesive tape placed over the polymer waveguide connector core array to prevent contamination may cause tearing of the polymer waveguide connector and/or result in residual glue on the polymer waveguide connector when the polyimide cover film and/or adhesive tape is removed, thereby effecting efficiency of adiatic coupling between the polymer waveguide connector and silicon waveguide.

SUMMARY

A method for assembling a waveguide connector includes positioning a polymer waveguide in one or more insertion structures within an inner portion of a cap where the polymer waveguide has alignment features. The method also includes inserting a ferrule into the inner portion of the cap such that an inner wall of the cap seals around the assembled connector and heating the polymer waveguide and the ferrule to a first temperature with the ferrule comprising alignment features and having a different coefficient of thermal expansion from the polymer waveguide. The alignment features of the polymer waveguide align with the alignment features of the ferrule when the polymer waveguide and the ferrule are heated to the first temperature.

A method for assembling a waveguide connector includes applying glue to one or more insertion structures of a cap and inserting a polymer waveguide into the one or more insertion structures of the cap where the polymer waveguide includes alignment features. The method also includes inserting a ferrule into the inner portion of the cap such that an inner wall of the cap seals around the assembled connector and heating the polymer waveguide and the ferrule to a first temperature with the ferrule having alignment features and having a different coefficient of thermal expansion from the polymer waveguide. The alignment features of the polymer waveguide align with the alignment features of the ferrule when the polymer waveguide and the ferrule are heated to the first temperature.

A method for assembling a waveguide connector includes positioning a polymer waveguide in one or more insertion structures within an inner portion of a cap where the polymer waveguide includes alignment features and inserting a ferrule into the inner portion of the cap such that an inner wall of the cap seals around the assembled connector. The method also includes heating the polymer waveguide and the ferrule to a first temperature with the ferrule having alignment features and having a different coefficient of thermal expansion from the polymer waveguide, with the alignment features of the polymer waveguide aligning with the alignment features of the ferrule when the polymer waveguide and the ferrule are heated to the first temperature. The method also includes cooling the polymer waveguide and the ferrule to a second temperature such that tension is created within the material of the polymer waveguide due to the different contraction rate of the waveguide relative to the contraction rate of the ferrule and such that the tension pulls a plurality of cores of the waveguide into position.

These and other features and advantages will become apparent from the following detailed description of illustrative embodiments thereof, which is to be read in connection with the accompanying drawings.

DETAILED DESCRIPTION

Embodiments of the present invention provide polymer waveguides with precise positioning, having positioning errors below one micrometer, and having a polymer waveguide core array with pristine surface areas for photonic packaging. To accomplish this, a polymer waveguide connector assembly device is provided. The polymer waveguide connector assembly device includes one or more guiding slots to receive a polymer waveguide chip and an enclosure to receive a glass lid, ferrule, and/or any other components of the polymer waveguide. The polymer waveguide connector assembly device may align the polymer waveguide chip, lid, ferrule, and/or any other components of the polymer waveguide while protecting the polymer waveguide chip from further processing steps to maintain a pristine surface on the polymer waveguide core array.

In some embodiments, the differing coefficients of thermal expansion (CTEs) of a waveguide material and a ferrule material are exploited by heating the two structures until they align, fastening the structures together, and letting them cool, thereby creating a tension in the polymer waveguide that precisely aligns the individual waveguides in the ferrule. By increasing the thickness of the bottom cladding of the polymer waveguide and by removing the backfilm that is normally used for support and positioning, the waveguide positioning may be made more consistent.

The functioning of a waveguide relies on total internal reflection of light—or other electromagnetic radiation—at a boundary. Waveguides at optical frequencies often take advantage of a difference in refractive index between two materials at the boundary. Fiber can be multi-mode or single-mode, referring to the propagation modes of the light as it passes through the waveguide. In the case of multimode fibers, multiple different transverse modes (i.e., multiple different light paths through the waveguide) can exist simultaneously in the relatively large waveguide core, where the core has a diameter that is much larger than the wavelength of the light carried. By contrast, in a single-mode fiber, only one transverse mode, called a zeroth mode or a fundamental mode, exists. This advantageously inhibits modal dispersion and provides superior fidelity of signals over long distances. In a single-mode fiber, a wavelength division multiplex (WDM) technology is often used for a broadband communication. When WDM is applied, multiple different frequencies of light are transmitted along one single-mode fiber, each propagating along the fiber in the fundamental mode. When dealing with single-mode optical fiber, an intuitive geometric interpretation for the propagation of light within the fiber is unavailable, with the behavior of the propagation being modeled instead using the Helmholtz equation.

Figure 1:
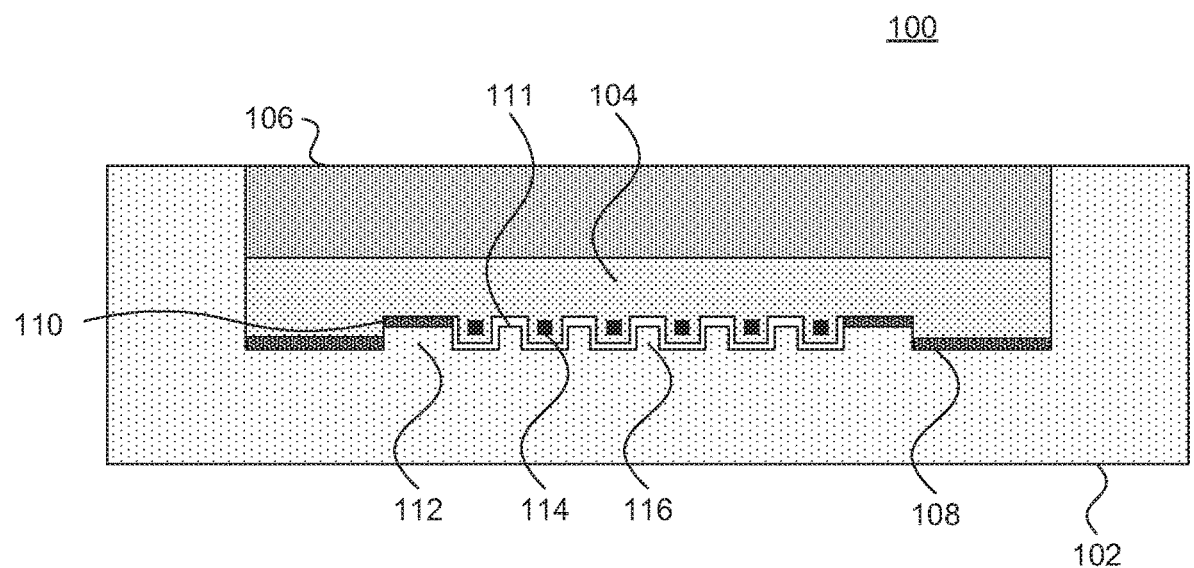
FIG. 1 is a cross-sectional diagram of a waveguide connector assembly in accordance with the present principles.
Figure 2:
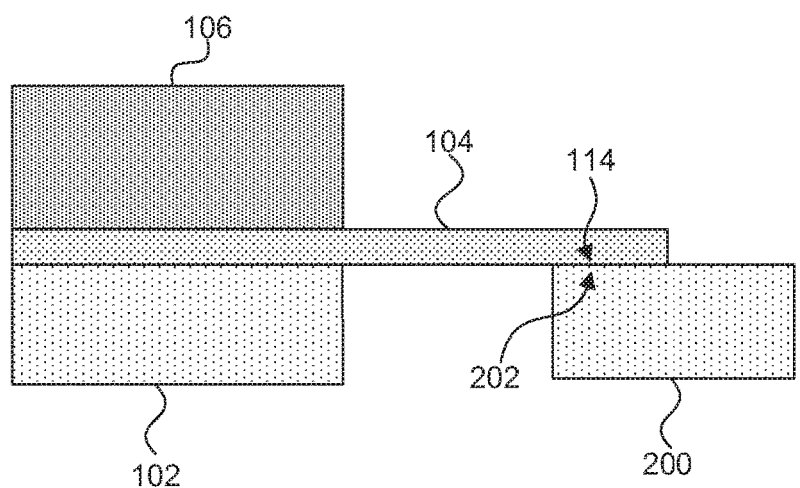
FIG. 2 is a side view diagram of a waveguide connector assembly for photonic packaging in accordance with the present principles.

Referring now to the drawings in which like numerals represent the same or similar elements and initially to FIG. 1, an exemplary polymer waveguide assembly 100 is illustratively depicted. In FIG. 2, the placement of a polymer waveguide 104 on a ferrule 102 is shown. The ferrule 102 may include a U-shaped structure. A lid 106 is used to place and hold the waveguide 104. It is contemplated that the waveguide 104 may have an exemplary CTE of about 50 ppm/° C., while the ferrule 102 may have an exemplary CTE of about 1 ppm/° C. The waveguide 104 includes a set of waveguide cores 114, a set of narrow grooves 111 between cores, and two wide grooves 110 on both sides of the core array.

The ferrule 102 includes two wide studs 112 and a set of narrow studs 116. At room temperature (e.g., 25° C.), if the distance between the two grooves 110 is about 3 mm, this distance would be an exemplary 3 µm smaller than the distance between the two studs 112 at room temperature. At a temperature of 45° C., however, the differing CTEs of the two structures results in the grooves 110 aligning with the studs 112, with the waveguide cores 114 also aligning with the narrow studs 116. It is specifically contemplated that the ferrule 102 may be part of, e.g., a mechanical transfer (MT) connector, but any appropriate connector may be used instead. It should be noted that other configurations of the waveguide connector assembly 100 is readily contemplated, including additional materials, and the embodiment shown in FIG. 1 is merely illustrative of a waveguide connector assembly in accordance with the present principles.

Optical connectors terminate an end of the optical fiber and provide for rapid connection and disconnection. By aligning the fibers of two sections of optical cable, the connectors ensure an easy connection and allow light to pass with little loss. Ideally the connectors have some form of locking ability that maintains a strong connection and prevents fibers in respective connectors from moving relative to one another. Maintaining good alignment is important for minimizing return loss, which occurs at discontinuities in the connection. Even small deviations in positioning and alignment can create significant return losses. The present embodiments bring cores 114 of respective connectors into alignment with very low deviation from the expected positions.

The MT connector is a multi-fiber connector that is often used for ribbon cables. It is used in, for example, predetermined cable assemblies and cabling systems. In particular, the MT connector allows multiple single-mode fibers to connected in parallel, such that one fiber ribbon cable will include multiple glass fibers and thereby provide increased transmission bandwidth. Connection strength is provided by latches on the connector that lock into place on a mated plug using a spring mechanism. Guide pins are used to aid in alignment of the ferrules 102 and removable housings may be employed for modularity. While this provides good mechanical alignment between two respective connectors, manufacturing imperfections can still result in misalignment between the small waveguide cores.

The polymer waveguide 104 is formed by forming waveguide cores on a lower refractive index under cladding polymer layer. The cores are formed by depositing, e.g., a higher refractive index polymer material using a photo lithography method or any other appropriate deposition method and patterning the core material to form waveguides of the desired shape. A lower index upper cladding polymer material is then deposited over the cores. The optical signal is confined by internal reflection to the waveguide core material at the interface between the waveguide core and the upper and lower cladding material. Single-mode glass fibers often have core diameters from about 5 to about 11 μm. The corresponding single-mode polymer waveguides also have a few cross sectional area of a few micrometers.

During placement, the waveguide 104 is heated to a temperature that causes an expansion of the waveguide 104, allowing it to align with the studs 116 and 112 of the ferrule 102 as described above. A glue 108 is applied to respective grooves 110 of the waveguide 104 and studs 112 of the ferrule 102. The glue 108 may be, e.g., an ultraviolet-cured glue that is then exposed to ultraviolet light, locking the sides of the waveguide 104 in place. Although it is specifically contemplated that a glue may be used, any other appropriate form of bonding may be employed instead. As the waveguide 104 cools, the waveguide 104 is prevented from shrinking accordingly and a tension is created within the waveguide 104 that pulls the polymer waveguide 104 flat and brings each waveguide core 114 into a precise position within the narrow studs 116.

In some embodiments, a thickness of the waveguide 104 may be increased. The thicker waveguide 104 provides structure and consistency in CTE. A glass lid 106 is then applied directly to the waveguide 104 to apply pressure while the ultraviolet glue 108 sets. The thickness of the underclad portion of the waveguide 104 may be, for example, about 50 μm—increased relative to conventional waveguides which have the underclad portion with a thickness of about 20 μm. This thickness provides stability of a precise core position during assembly, easy manipulation of the waveguide 104, and increased physical strength of the waveguide 104 after assembly. In one exemplary embodiment, the underclad portion of the waveguide 104 has a thickness of about 50 μm while the topclad portion that includes waveguide cores 114 has a thickness of about 23 to 24 μm. In this exemplary embodiment, a spacing between cores 114 is about 250 μm.

In some embodiments, omitting a back film and using a waveguide 104 provides superior alignment of the waveguide cores 114, with experimentally demonstrated positioning errors of less than 1 μm. Improvements are shown in height, lateral, and absolute misalignment values. The thickness of the waveguide 104 does not decrease the CTE of the material, which is used to provide precise alignment of the waveguide cores 114.

Referring now to FIG. 2, a cross-sectional side view of the polymer waveguide connector assembly for silicon photonic packaging is illustratively depicted. In FIG. 2, a portion of the waveguide 104 is disposed between the ferrule 102 and the lid 106, while another portion of the waveguide 104 extends outwardly and connects to a silicon optical circuit on a silicon chip 200. Specifically, the waveguide cores 114 on the waveguide 104 are aligned with and connect to respective silicon waveguides 202 on the silicon chip 200 via adiabatic coupling techniques. In some embodiments, alignment ridges and/or alignment grooves (not shown) on the waveguide 104 and/or silicon chip 200 may be employed for proper alignment of the waveguide cores 114 and silicon waveguides 202.

Such connection between the waveguide 104 and the silicon chip 200 may enable a pitch conversion from the silicon chip 200 (e.g., 50 um) to the waveguide 104 (e.g., 250 um), and may experience lower loss connection than conventional connection methods, such as diffraction grating coupling. However, because the waveguide cores 114 and the silicon waveguides 202 are in direct contact with each other, the surface of the waveguide 104 at the interface between the waveguide 104 and the silicon chip 200 should be sufficiently clean and free of defects to employ efficient adiabatic coupling.

Figure 3:
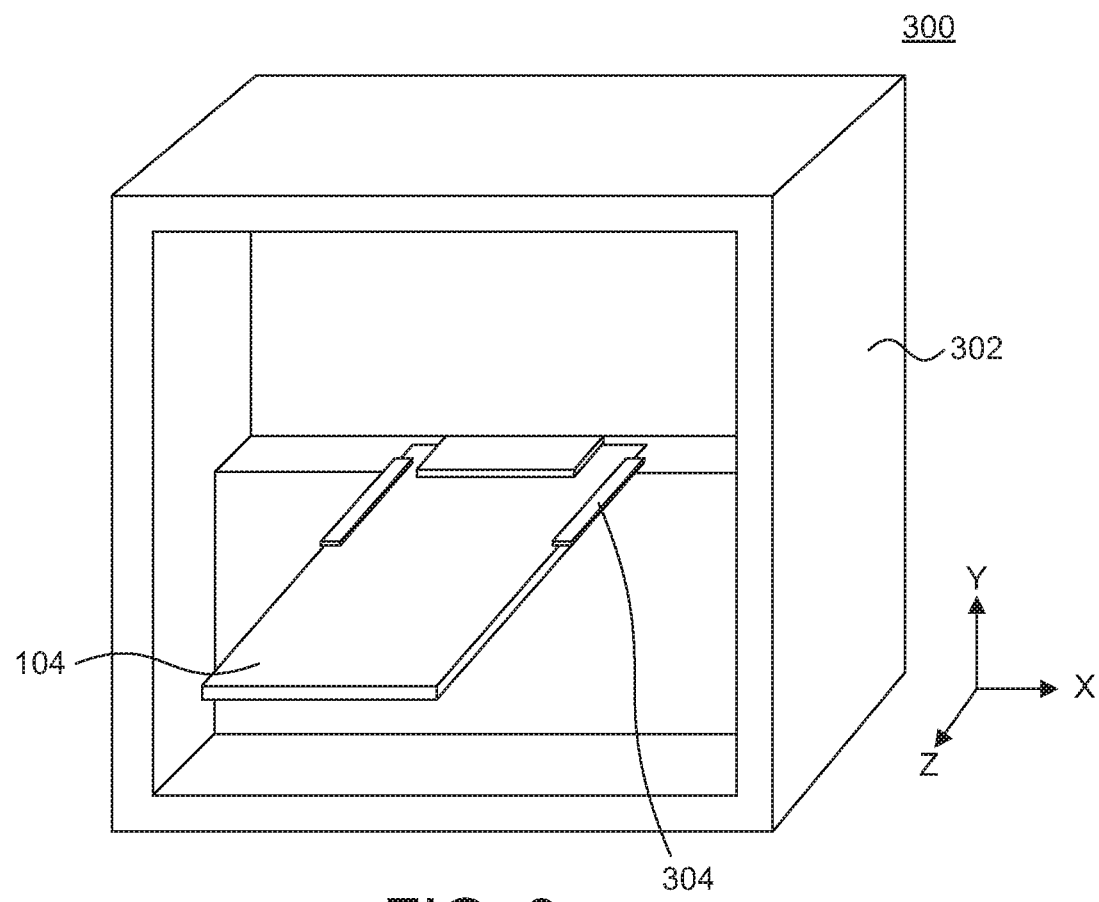
FIG. 3 is a perspective view diagram of a waveguide connector assembly device in accordance with the present principles.

Now referring to FIG. 3, a perspective view of a polymer waveguide connector assembly device 300 is illustratively depicted. The assembly device 300 may include a cap 302. The cap 302 may be formed of a transparent elastomer, transparent silicone, and/or a rubber material using an injection molding method (e.g., metal cast). In an embodiment, the cap 302 may include various dimensions and/or shapes suitable for receiving various components of the waveguide connector assembly 100. While a cubic shape is illustratively depicted for the cap 302, other shapes are readily contemplated.

In an embodiment, the assembly device 300 may include one or more insertion structures 304, such as guiding slots, grooves, flanges, and/or tapered structures. The insertion structures 304 may extend from the cap 302, such as an embedded structure, and/or may be integrally formed with the cap 302. In some embodiments, the guiding slots may be formed of a transparent elastomer, transparent silicone, and/or a rubber material using an injection molding method (e.g., metal cast) as a part of the cap 302. In some embodiments, the guiding slots may be formed of a hard polymer, such as acrylic, that may be added to an inner portion (e.g., inner wall) of the cap 302. For example, the guilding slots may be added to the cap 302 as an independent component. The guiding slots may include various dimensions, such as 3 millimeters (mm) in length by 0.5 mm in width when using a waveguide 104 being 3 mm in width and 11 mm in length. For example, the insertion structures 304 may extend from a back inner wall or a ledge within the cap 302. The insertion structures 304 may be configured to receive the waveguide 104 and maintain the position of the waveguide 104 during assembly of the waveguide connector assembly 100.

In an embodiment, the insertion structures 304 may include grooves (not shown) having a thickness slightly larger than and/or substantially similar to a thickness of the waveguide 104. For example, the waveguide 104 may fit within the grooves such that the grooves maintain proper positioning of the waveguide 104. The grooves may be an indentation within the inner walls of the cap 302. Accordingly, the insertion structures 304 may provide a contactless protector for the waveguide 104 and may provide slight tuning of the waveguide 104. In an embodiment, the insertion structures 304 may include a spacing approximately between 10-100 um such that the waveguide 104 "sits" within the in the insertion structures 304 while the ferrule 102 is being aligned with the waveguide 104. Accordingly, the insertion structures 304 may allow slight tuning (e.g., positioning) of the waveguide 104 in the X, Y, and/or Z directions.

The cap 302 may be employed to protect the waveguide 104 from contamination of polishing dusts and/or cleansing agents (e.g., washing liquids) during assembly of the waveguide connector assembly 100. Accordingly, the present principles do not suffer from the effects of using polyimide cover films and/or adhesive tape placed over the waveguide 104, such as tearing of the waveguide 104 and/or residual glue present on the waveguide 104.

Figure 4:
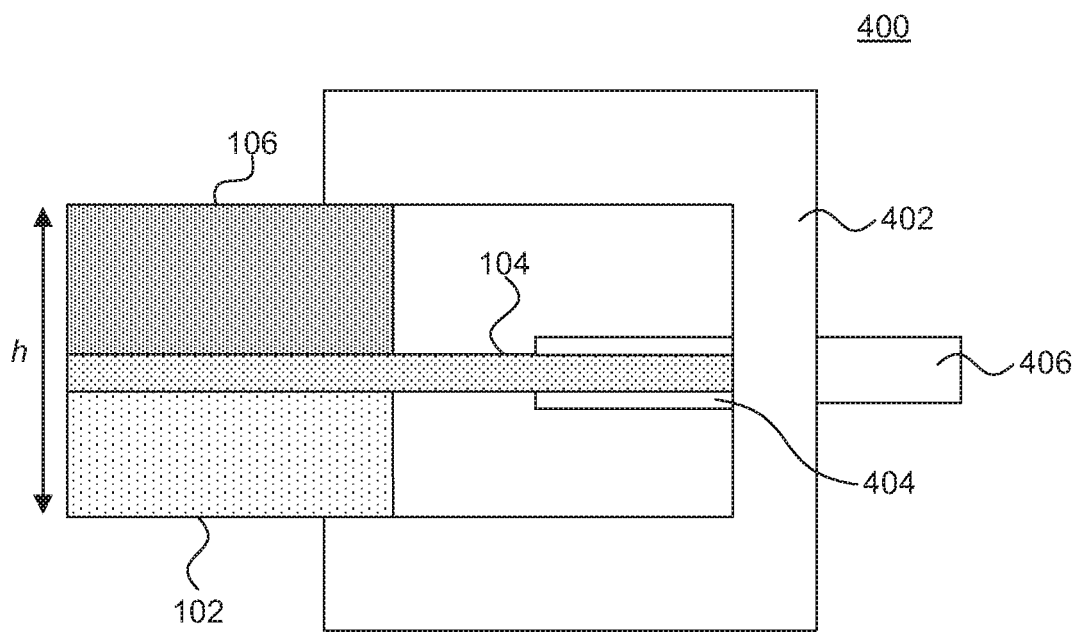
FIG. 4 is a cross-sectional diagram of a waveguide connector assembly device in accordance with the present principles.

Referring to FIG. 4, a cross-sectional view of a polymer waveguide connector assembly device 400 is illustratively depicted. The waveguide 104 may be inserted into insertion structures 404, such as flanges, attached/coupled to the cap 402. In the embodiment shown in FIG. 4, the flanges 404 are positioned such that a top surface and a bottom surface of the waveguide 104 rests between the flanges 404. A ferrule 102 and/or lid 106 may be inserted into an inner portion of the cap 402 having a height h such that the ferrule 102 is positioned under the waveguide 104 and the lid 106 is positioned over the waveguide 104. The inner portion of the cap 402 conforms around the ferrule 102, waveguide 104, and/or lid 106 such that the inner portion of the cap 402 remains sealed, thereby protecting the waveguide 104 from contaminants.

In an embodiment, the ferrule 102 and the lid 106 may be inserted simultaneously subsequent to inserting the waveguide 104. In an alternative embodiment, the ferrule 102 and the lid 106 may be inserted one after another. In an embodiment, the ferrule 102 and/or the lid 106 may be simultaneously or mutually inserted into the inner portion of the cap 402 prior to the insertion of the waveguide 104. In an embodiment, the ferrule 102 may be inserted into the cap 402, and waveguide 104 and/or lid 106 may be inserted through the ferrule 102, which may be U-shaped, and aligned with the ferrule 102.

The waveguide 104 may be heated to a temperature that causes an expansion of the waveguide 104, allowing it to align with the studs 112, 116 (not shown) of the ferrule 102, and a glue 108 (not shown), such as an ultraviolent glue and/or other bonding material, may be applied to respective grooves 110 (not shown) of the waveguide 104 and studs 112 of the ferrule 102, as illustrated in FIG. 1. As the waveguide 104 cools, the waveguide 104 is prevented from shrinking accordingly and a tension is created within the waveguide 104 that pulls the polymer waveguide 104 flat and brings each waveguide core 114 (not shown) into a precise position within the narrow studs 116.

In an embodiment, the polymer waveguide connector assembly device 400 may include a light source 406. The light source 406 may propagate a lightwave through the cap 402 and travel traversely through the waveguide 104 and ferrule 102. For example, the cap 402 may include transparent material configured to allow light from the light source 406 through the cap 402 and through the waveguide 104 and ferrule 102 to ensure proper alignment between the waveguide cores 114 (not shown) and narrow studs 116 (not shown). In an embodiment, the cap 402 may include a channel (not shown) to allow a lightwave to pass traversely through the cap 402, waveguide 104 and ferrule 102.

Figure 5:
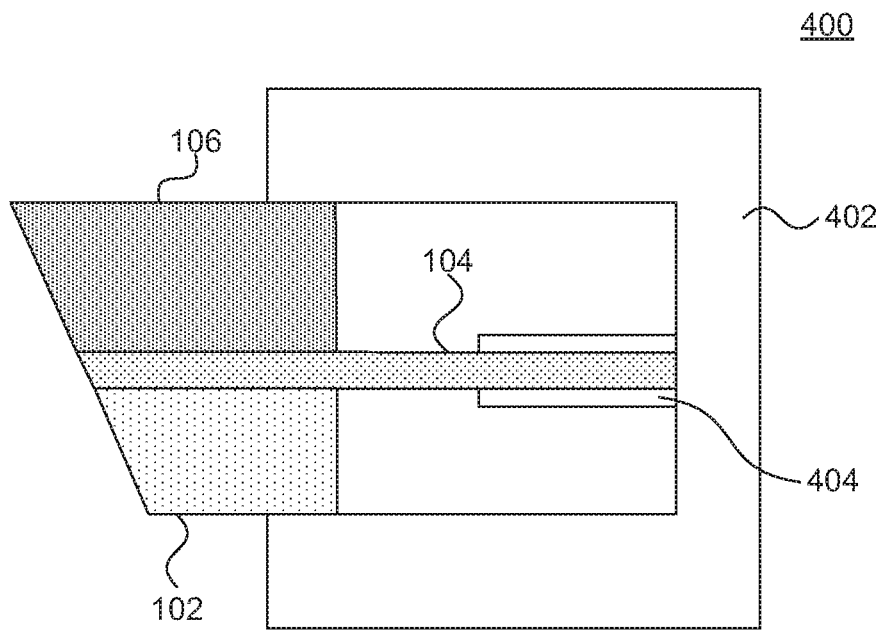
FIG. 5 is a cross-sectional diagram of a waveguide connector assembly device in accordance with the present principles.
Figure 6:
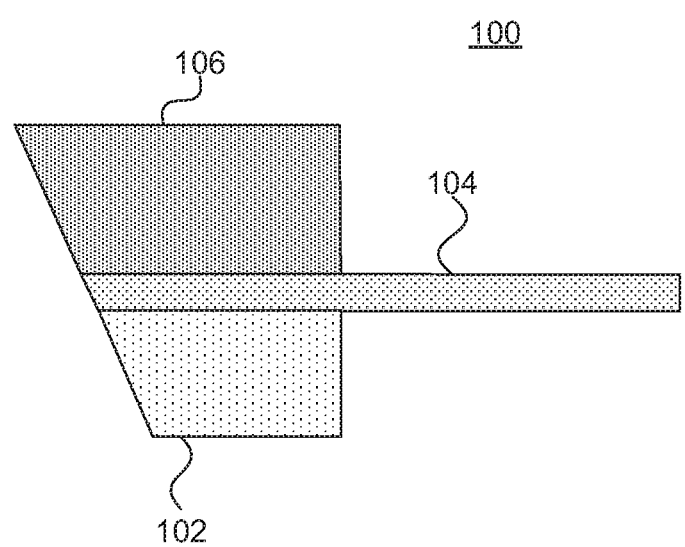
FIG. 6 is a cross-sectional diagram of a waveguide connector assembly in accordance with the present principles.

Referring now to FIG. 5, the ferrule 102, waveguide 104, and/or lid 106 may be polished and/or washed. For example, a polish may be employed using a polishing sheet and water, however it is readily contemplated that other polishing techniques are contemplated, such as employing a dry polishing sheet. In an embodiment, the ferrule 102, waveguide 104, and lid 106 may be polished at a specific angle, such as 8 degrees, however other angles are readily contemplated.

In a further embodiment, a washing process may be performed on the polymer waveguide connector assembly to remove any unwanted debris, such as polishing dusts and/or any other contaminants. Because the cap 402 surrounds and encloses the waveguide 104 during the polishing and/or washing processes, the cap prevents water, cleansing agents, polishing dusts, and further contaminants to enter, thereby protecting the waveguide 104 from any unwanted contaminants on the surface thereof. Accordingly, the surfaces of the waveguide 104 remain pristine for adiabatic coupling. The polymer waveguide connector assembly device 400 may be removed, and the polymer waveguide connector assembly 100 may be employed for further processing, including silicon photonic packaging.

Figure 7:
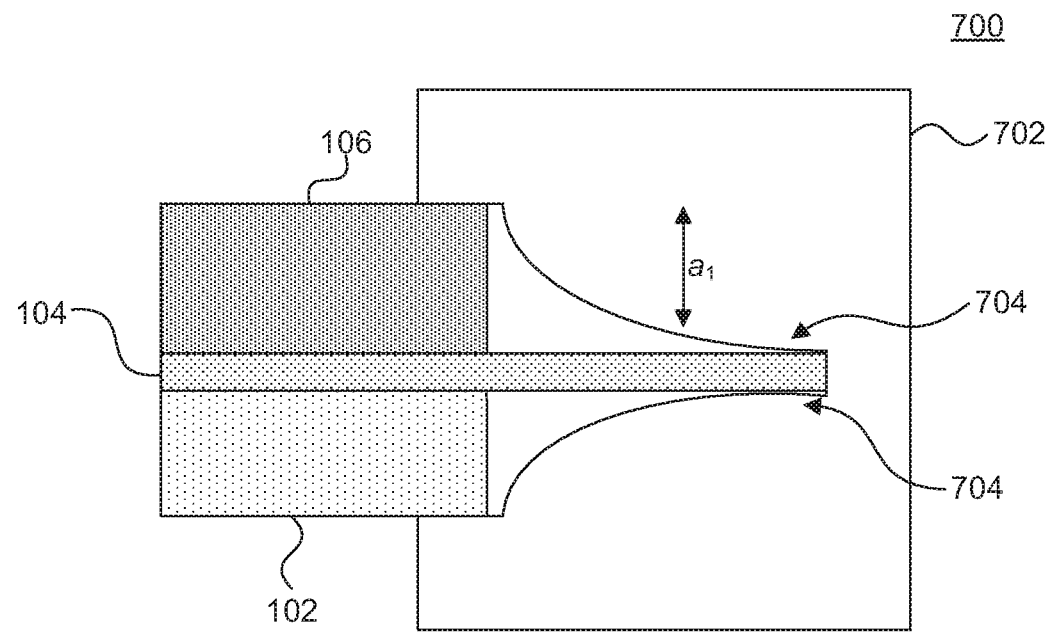
FIG. 7 is a cross-sectional diagram of a waveguide connector assembly device in accordance with the present principles.

Now referring to Referring to FIG. 7, a cross-sectional view of a polymer waveguide connector assembly device 700 is illustratively depicted. In an embodiment, the polymer waveguide connector assembly device 700 may include a cap 702 and one or more insertion structures 704. The insertion structures 704 may include a tapered shape having a first thickness a1 which gradually thins and/or narrows towards one or more ends, such as an end at the opening of the cap 702 and/or an end toward the inner back wall of the cap 702. The tapered structures 704 may firmly hold and position the waveguide 104. The tapered structure 704 may be integrally formed with the cap 702 and/or may include the same materials employed for the cap 702. For example, the tapered structure 704 may include materials such as a thermoplastic elastomer, thermosetting elastomer, silicone, and/or rubber.

A ferrule 102 and/or lid 106 may be inserted into an inner portion of the cap 702 such that the ferrule 102 is positioned under the waveguide 104 and the lid 106 is positioned over the waveguide 104. The inner portion of the cap 702 conforms around the ferrule 102, waveguide 104, and/or lid 106 such that the inner portion of the cap 702 remains sealed, thereby protecting the waveguide 104 from contaminants.

Figure 8:
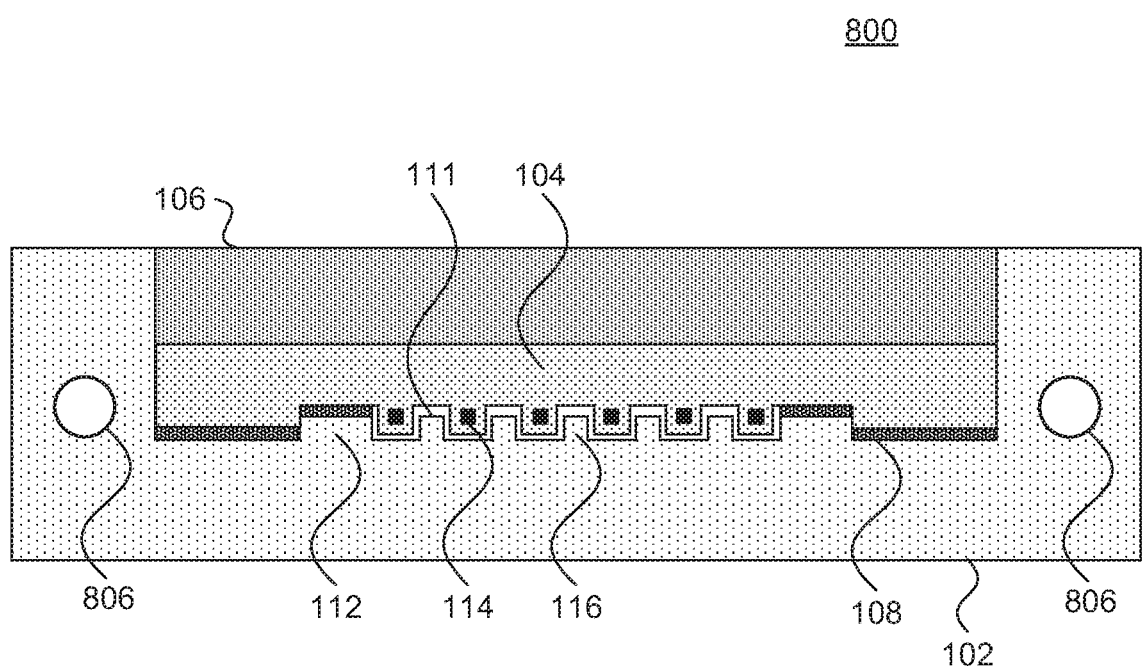
FIG. 8 is a cross-sectional diagram of a waveguide connector assembly in accordance with the present principles.

Referring now to FIG. 8, another exemplary polymer waveguide assembly 800 is illustratively depicted. The ferrule 102 may include a U-shaped structure having one or more holes 806. The holes 806 may extend through a portion of the ferrule 102 or through an entire width of the ferrule 102. The holes 806 are shown as circular, however other shapes for the holes 806 are readily contemplated. While two holes 806 are shown, it is readily contemplated that additional holes 806 may be employed. A lid 106 is used to place and hold the waveguide 104 on the ferrule 102. Additional features of the ferrule 102, waveguide 104, and/or lid 106 are described above with reference to FIG. 1.

Figure 9:
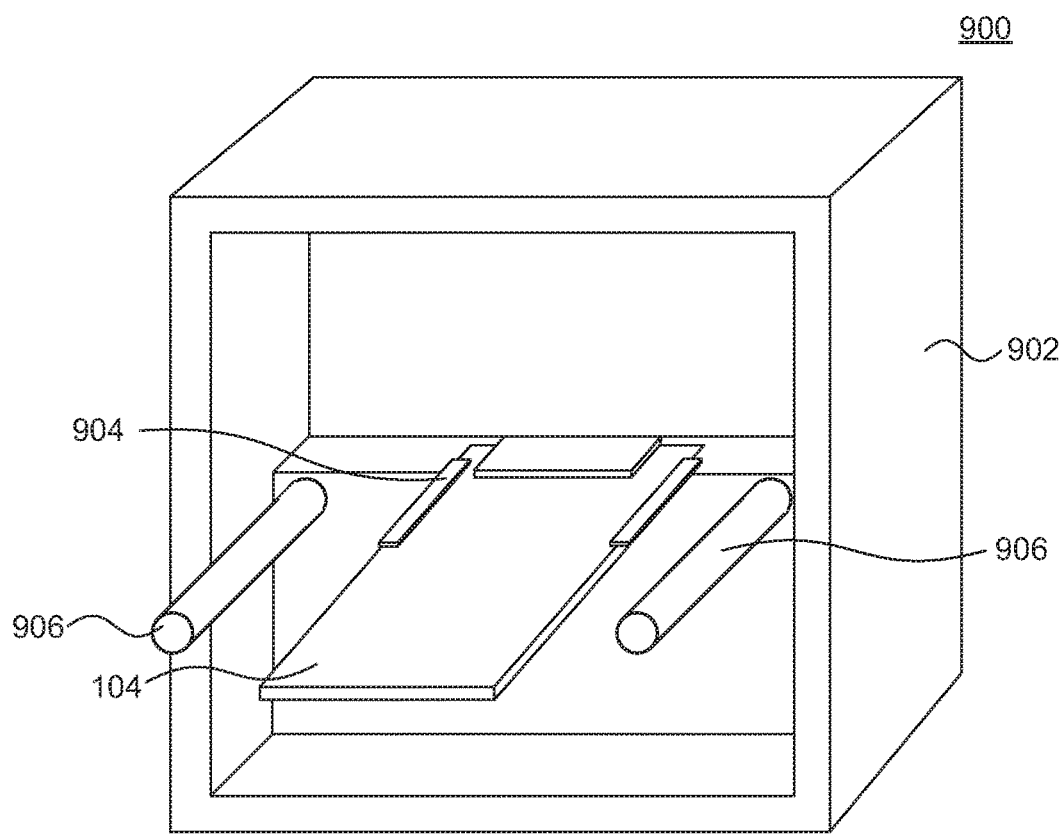
FIG. 9 is a perspective view diagram of a waveguide connector assembly device in accordance with the present principles.

Now referring to FIG. 9, with continued reference to FIG. 1, a perspective view of a polymer waveguide connector assembly device 900 in accordance with the present principles is illustratively depicted. The assembly device 900 may include a cap 902, and may include various materials such as a transparent elastomer, transparent silicone, and/or a rubber material formed using an injection molding method. In an embodiment, the assembly device 900 may include one or more insertion structures 904, such as guiding slots, grooves, and/or tapered structures. The insertion structures 904 may be configured to receive the waveguide 104 and maintain the position of the waveguide 104 during assembly of the waveguide connector assembly 100, 800.

In an embodiment, the assembly device 900 may include one or more guide pins 906 extending from the cap 902. The guide pins 906 may be formed from a stainless steel, however other materials are readily contemplated. In an embodiment, the guide pins 906 fit into the holes 806 of the polymer waveguide connector assembly 800 shown in FIG. 8. The guide pins 906 may help to align the ferrule 102 and waveguide 104 to ensure proper alignment of the waveguide cores 114 and studs 112, 116. In an embodiment, guide pins 906 may extend from a back inner wall or a ledge within an inside wall of the cap 902.

Figure 10:
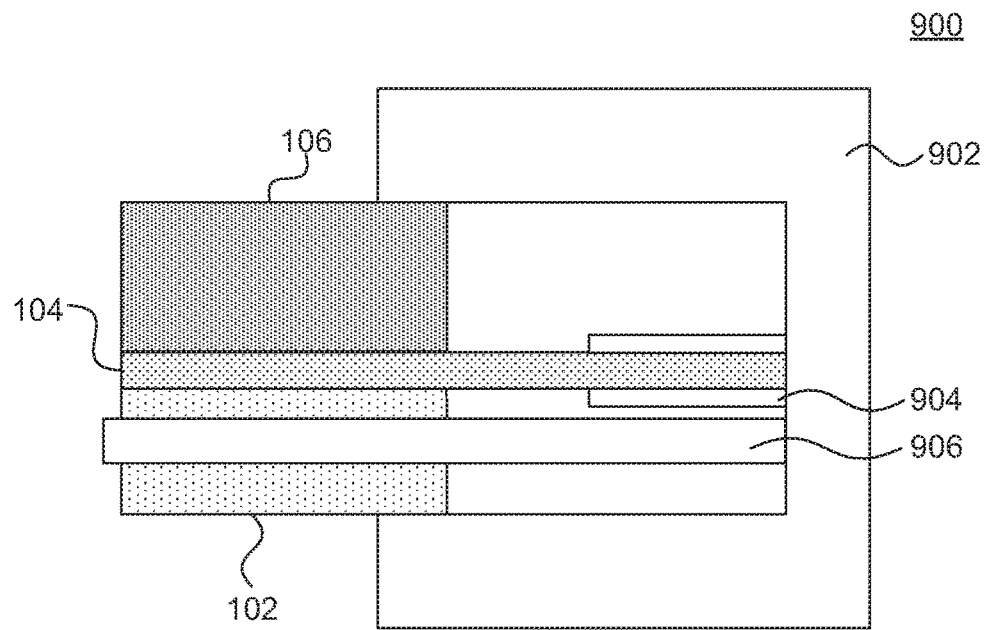
FIG. 10 is a cross-sectional diagram of a waveguide connector assembly device in accordance with the present principles.

Now referring to FIG. 10, a cross-sectional view of the polymer waveguide connector assembly device 900 is illustratively depicted. The waveguide 104 may be inserted into insertion structures 904, such as flanges, grooves, and/or tapered structures, attached/coupled to the cap 902. The ferrule 102 may be inserted between the waveguide 104 and the cap 902. In an embodiment, guide pins 906 extending from the cap 902 may be inserted through the holes 806 of the ferrule 102. The guide pins 906 may help to properly align the ferrule 102 with the waveguide 104. The inner portion of the cap 902 conforms around the ferrule 102, waveguide 104, and/or lid 106 such that the inner portion of the cap 902 remains sealed, thereby protecting the waveguide 104 from contaminants due to polishing and/or washing processes.

The waveguide 104 may be heated to a temperature that causes an expansion of the waveguide 104, allowing it to align with the studs 112, 116 (not shown) of the ferrule 102, and a glue 108 (not shown), such as an ultraviolet glue and/or other bonding material, may be applied to respective grooves 110 (not shown) of the waveguide 104 and studs 112 of the ferrule 102, as illustrated in FIG. 1. As the waveguide 104 cools, the waveguide 104 is prevented from shrinking accordingly and a tension is created within the waveguide 104 that pulls the polymer waveguide 104 flat and brings each waveguide core 114 (not shown) into a precise position within the narrow studs 116.

The cap 902 protects the waveguide 104 from contamination of polishing dusts and/or washing liquids during assembly of the waveguide connector assembly 800. Accordingly, the present principles do not suffer from the effects of using polyimide cover films and/or adhesive tape placed over the waveguide 104, such as tearing of the waveguide 104 and/or result in residual glue on the waveguide 104.

Figure 11:
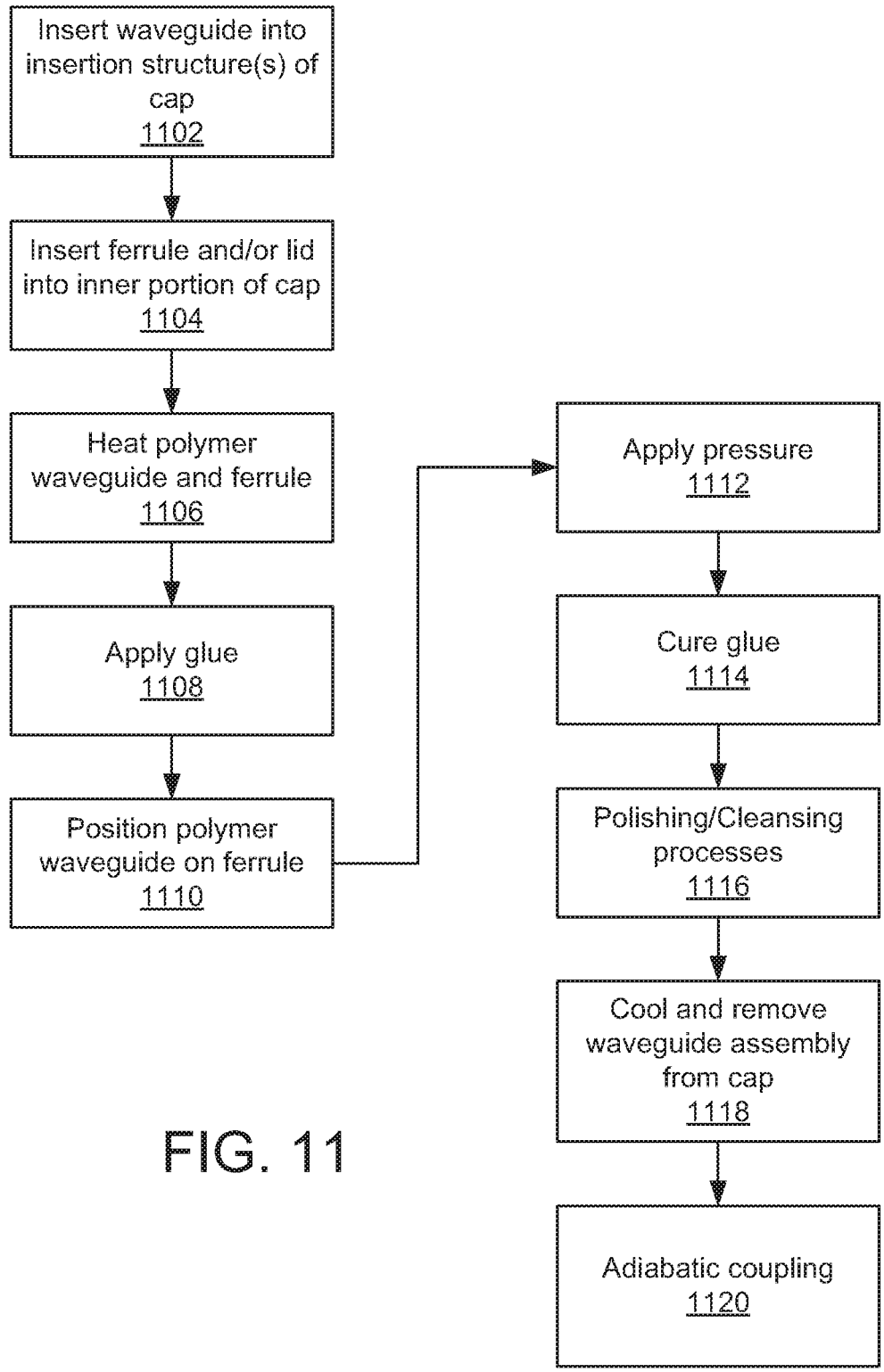
FIG. 11 is a block/flow diagram of a method of forming a waveguide connector in accordance with the present principles.

Referring now to FIG. 11, a method 1100 for constructing a connector is shown. In block 1102, a waveguide 104 may be inserted into one or more insertion structures 404, 704 of a cap 402. The insertion structures 404 may include flanges, grooves, tapered structures and/or similarly functioning devices configured to position the waveguide 104 for proper alignment with a ferrule 102 and/or lid 106. In block 1104, a ferrule 102 and/or a lid 106 may be inserted into an inner portion of the cap. In an embodiment, the ferrule 102 may be positioned over guiding pins 906 such that holes 806 in the ferrule 102 align with the guiding pins 906.

Block 1106 heats the polymer waveguide 104 and the ferrule 102 until the grooves 110 align with studs 112. As noted above, the polymer waveguide 104 starts with, e.g., a smaller width between grooves 110 than the width between the studs 112 of the ferrule 102. Due to CTE mismatch between the materials of the polymer waveguide 104 and the ferrule 102, the polymer waveguide 104 will expand at a different rate per degree of temperature change, such that at some temperature the widths will be equal. Block 1108 applies, e.g., an ultraviolet curing glue 108 to the grooves 110 and/or the studs 112 and block 1110 positions the polymer waveguide 104 on the ferrule 102, aligning the grooves 110 and the studs 112. For example, glue may be inserted inside portions of the ferrule 102, waveguide 104, and/or lid 106 while the components are inserted into the cap.

Block 1112 applies pressure to the polymer waveguide 104 using, e.g., the glass lid 106. Block 1114 cures the glue by applying, e.g., ultraviolet light. This locks the grooves 110 and the studs 112 together. In an embodiment, the ferrule 102, waveguide 104, and/or lid 106 may be polished using one or more polishing techniques and/or cleansed to remove any polishing dusts and/or unwanted contaminants from a portion of the waveguide assembly 100, as shown in block 1116. Because the cap seals the exposed portion of the waveguide 104, polishing dusts and/or unwanted contaminants do not form on the waveguide 104 used for silicon photonic packaging.

Block 1118 then removes the pressure from the polymer waveguide 104 and allows the polymer waveguide 104 and the ferrule 102 to cool. As they cool, the polymer waveguide 104 attempts to contract more quickly than the ferrule 102, creating a tension within the material of the polymer waveguide 104. This tension pulls the cores 114 precisely into position. In block 1120, the assembled connector may then be coupling to a silicon optical circuit by adiabatic coupling processes for silicon photonic packaging.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a single-mode polymer waveguide connector assembly device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for assembling a waveguide connector, comprising:
   positioning a polymer waveguide in one or more insertion structures within an inner portion of a cap, wherein the polymer waveguide comprises alignment features;

inserting a ferrule into the inner portion of the cap such that an inner wall of the cap seals around the assembled connector; and heating the polymer waveguide and the ferrule to a first temperature, the ferrule comprising alignment features and having a different coefficient of thermal expansion from the polymer waveguide, wherein the alignment features of the polymer waveguide align with the alignment features of the ferrule when the polymer waveguide and the ferrule are heated to the first temperature.

2. The method of claim 1, wherein positioning the polymer waveguide in one or more insertion structures includes inserting the polymer waveguide in grooves coupled to the cap having a thickness substantially similar to a thickness of the polymer waveguide.

3. The method of claim 1, wherein positioning the polymer waveguide in one or more insertion structures includes inserting the polymer waveguide in a tapered structure integrally formed with the inner portion of the cap.

4. The method of claim 1, further comprising aligning one more guiding pins coupled to the cap with respective holes in the ferrule, wherein the one or more guiding pins align the ferrule to the polymer waveguide.

5. The method of claim 1, further comprising propagating light through the cap towards the assembled connector to align the alignment features of the ferrule with the alignment features of the polymer waveguide.

6. A method for assembling a waveguide connector, comprising:
applying glue to one or more insertion structures of a cap;
inserting a polymer waveguide into the one or more insertion structures of the cap, wherein the polymer waveguide comprises alignment features;
inserting a ferrule into the inner portion of the cap such that an inner wall of the cap seals around the assembled connector; and
heating the polymer waveguide and the ferrule to a first temperature, the ferrule comprising alignment features and having a different coefficient of thermal expansion from the polymer waveguide, wherein the alignment features of the polymer waveguide align with the alignment features of the ferrule when the polymer waveguide and the ferrule are heated to the first temperature.

7. The method of claim 6, further comprising inserting glue inside portions of the ferrule while the ferrule is inserted into the cap.

8. The method of claim 6, further comprising inserting glue inside portions of the waveguide while the waveguide is inserted into the cap.

9. The method of claim 6, further comprising applying pressure by an application of a glass lid to the polymer waveguide.

10. The method of claim 6, further comprising curing the glue by applying ultraviolet light.

11. The method of claim 6, wherein inserting the polymer waveguide into the one or more insertion structures includes inserting the polymer waveguide in grooves coupled to the cap.

12. The method of claim 6, wherein inserting the polymer waveguide into the one or more insertion structures includes inserting the polymer waveguide in a tapered structure integrally formed with the inner portion of the cap.

13. The method of claim 6, further comprising aligning one more guiding pins coupled to the cap with respective holes in the ferrule, wherein the one or more guiding pins align the ferrule to the polymer waveguide.

14. The method of claim 6, further comprising propagating light through the cap towards the assembled connector to align the alignment features of the ferrule with the alignment features of the polymer waveguide.

15. The method of claim 6, further comprising cooling the polymer waveguide and the ferrule to a second temperature such that tension is created within the material of the polymer waveguide due to a different contraction rate of the waveguide relative to a contraction rate of the ferrule and such that that the tension pulls a plurality of cores of the waveguide into position.

16. A method for assembling a waveguide connector, comprising:
positioning a polymer waveguide in one or more insertion structures within an inner portion of a cap, wherein the polymer waveguide comprises alignment features;
inserting a ferrule into the inner portion of the cap such that an inner wall of the cap seals around the assembled connector;
heating the polymer waveguide and the ferrule to a first temperature, the ferrule comprising alignment features and having a different coefficient of thermal expansion from the polymer waveguide, wherein the alignment features of the polymer waveguide align with the alignment features of the ferrule when the polymer waveguide and the ferrule are heated to the first temperature; and
cooling the polymer waveguide and the ferrule to a second temperature such that tension is created within the material of the polymer waveguide due to a different contraction rate of the waveguide relative to a contraction rate of the ferrule and such that the tension pulls a plurality of cores of the waveguide into position.

17. The method of claim 16, further comprising propagating light through the cap towards the assembled connector to align the alignment features of the ferrule with the alignment features of the polymer waveguide.

18. The method of claim 16, further comprising inserting glue inside portions of the waveguide while positioning the waveguide in the one or more insertion structures within the inner portion of the cap.

19. The method of claim 16, wherein positioning the polymer waveguide in one or more insertion structures includes inserting the polymer waveguide in grooves coupled to the cap.

20. The method of claim 16, further comprising aligning one more guiding pins coupled to the cap with respective holes in the ferrule, wherein the one or more guiding pins align the ferrule to the polymer waveguide.

* * * * *